United States Patent
Rodriguez

(10) Patent No.: US 11,287,061 B1
(45) Date of Patent: Mar. 29, 2022

(54) UNDERGROUND GAS LINE PROTECTION AND METHOD TO USE

(71) Applicant: Ryan Rodriguez, Jacksonville, FL (US)

(72) Inventor: Ryan Rodriguez, Jacksonville, FL (US)

(*) Notice: Subject to any disclaimer, the term of this patent is extended or adjusted under 35 U.S.C. 154(b) by 0 days.

(21) Appl. No.: 17/182,310

(22) Filed: Feb. 23, 2021

(51) Int. Cl.
*F16L 1/11* (2006.01)
*G01V 15/00* (2006.01)

(52) U.S. Cl.
CPC ............... *F16L 1/11* (2013.01); *G01V 15/00* (2013.01)

(58) Field of Classification Search
CPC .................................... F16L 1/11; G01V 15/00
See application file for complete search history.

(56) References Cited

U.S. PATENT DOCUMENTS

| | | | |
|---|---|---|---|
| 2,958,546 A | 11/1960 | Lee | |
| 3,282,057 A | 11/1966 | Prosser | |
| 3,581,703 A | 6/1971 | Hosack | |
| 3,877,491 A | 4/1975 | Thastrup | |
| 4,623,282 A * | 11/1986 | Allen | F16L 1/11 116/DIG. 14 |
| 4,699,838 A | 10/1987 | Gilbert | |
| 4,767,237 A * | 8/1988 | Cosman | G01V 15/00 174/37 |
| 4,781,958 A | 11/1988 | Gilbert | |
| 4,879,162 A * | 11/1989 | Hansen, Sr. | B32B 27/32 428/196 |
| 4,949,664 A | 8/1990 | Wallace | |
| 6,691,727 B2 | 2/2004 | Jensen | |
| 6,702,518 B2 | 3/2004 | Harris | |
| 7,616,119 B2 | 11/2009 | Corbett | |
| 9,441,772 B2 | 9/2016 | Pajak | |
| 10,401,526 B2 | 9/2019 | Bench | |
| 2014/0167763 A1 | 6/2014 | Giraldi | |
| 2017/0243144 A1 | 8/2017 | Nielsen | |
| 2018/0259676 A1 | 9/2018 | Dunn | |

* cited by examiner

*Primary Examiner* — Sean D Andrish
(74) *Attorney, Agent, or Firm* — Lawrence J. Gibney, Jr.

(57) ABSTRACT

The present invention is an underground gas line protective barrier to help prevent damage by common excavation. The core components of the invention include a protective barrier, warning text on the protective barrier, and a locatable wire, which is commonly referred to as a tracer wire, which, generally speaking, are configured as follows: a woven protection barrier with warning text and a locatable wire positioned beside the barrier but attached to the protective barrier. The protective barrier is placed directly on the underground line with the tracer wire to the side of the protective barrier. With respect to the associated method, in order to carry out the method the following core steps are followed: unroll the product directly over the gas line, apply dirt on the product as needed to hold it in place, and continue with normal backfill procedure to cover the device.

5 Claims, 4 Drawing Sheets

UNDERGROUND GAS LINE PROTECTION AND METHOD TO USE

RELATED APPLICATIONS AND PRIORITY CLAIM

The applicant filed a provisional application on Jun. 22, 2020 with an application number of 63/042,508. The applicant is claiming priority for this application based on the prior filed provisional application.

FIELD OF THE INVENTION

The invention relates generally to underground gas line protection. Currently, there are a number of solutions for underground gas line protection. Some of these solutions attempt to warn the excavator by burying a standard caution/warning tape above the gas line, but not directly on the gas line. These solutions fail to meet the needs of the industry because the tape is not always encountered first, depending on which direction the excavator is digging from, thus the warning message is easily missed. The standard caution/warning tape offers little to no resistance to any direct hit by an excavating hand tool or shovel, providing no direct protection from an excavator only warning. Lastly the standard caution/warning tape does not always rest directly in line with the underground gas line due to the gas line being covered with dirt before the placement of the caution/warning tape in the prior art. Other solutions attempt to provide a warning and tracible tape/foil, but these solutions are similarly unable to meet the needs of the industry because they still offer little to no resistance to a direct hit by a hand tool or shovel providing no direct protection from an excavator only warning. Lastly the tape/foil does not always rest directly in line with the underground gas line due to the gas line being covered with dirt before the application of the product. Still, other solutions seek to provide a board that provides direct protection from an excavator, but these solutions also fail to meet industry needs because the board is not traceable for future line location markings and the product is not easily applied or transported due to only being in short rigid sections that require fastening to join together which is a slower process making installation labor intensive and therefore cost prohibitive.

PRIOR ART

There are many other prior art references to locate or protect underground pipes and a representative example of this type of device can be found at Corbett U.S. Pat. No. 7,616,119 which is a metallic tape by which the technician in the field can locate the buried pipe. Another example that teaches a method to locate the pipe can be found at Bench U.S. Pat. No. 10,401,526. While both these references teach or discuss the use of material to locate the pipe the current application teaches a method by which an underground pipe with additional important features that are not found in the prior art.

The use of detectable tape to find an underground pipe can be found at Gilbert, U.S. Pat. No. 4,781,958 and reinforced metallic tape is found at Gilbert U.S. Pat. No. 4,699,838. The current application also teaches a metallic tracer wire and a reinforced cover but teaches a different way to install the device.

A specific reference to an underground conveyance protection device can be found at Harris, U.S. Pat. No. 6,702,518 which covers the pipe with webbing that will make it difficult for the excavation equipment. This device is installed in a completely different fashion and is not installed by laying the device over the buried line.

There are other examples in the prior art that teach or discuss the protection of underground pipes but none of the prior art teaches the specific features that are taught in the current application to locate and protect an underground line while also providing a warning for the technician in the field.

SUMMARY OF THE INVENTION

It is desirable to have a device that protects underground utility lines—especially gas—from damage caused by hand or power tools. While this application will focus on buried gas lines, this device will protect any buried line. Specifically, in the gas industry underground gas lines are commonly damaged by excavators and hand tools such as shovels due to the lack of any form of sufficient warning and protection. A protective barrier that can also warn the excavator with labeling and provide a locatable gas line for future location marking would best protect the underground gas line. Furthermore, it would also be desirable to have a device that includes excavation protection, warning labeling, and the ability to locate the buried utility line all in one product. Still, further, it would be desirable to have a device that is easily transported, applied, and is affordable. The disclosed device and associated method advantageously fills these needs and addresses the aforementioned deficiencies by providing a layer of protection, labeling, and locate ability to avoid damage to underground gas that is easily cut or damaged by excavation tools.

Disclosed is a underground gas line protection, warning, and locater device, which is made up of the following components: a woven protective barrier, warning labeling, and locatable wire. These components are connected as follows; the protective barrier as the main body of the layer with the warning label printed on one or both sides of the barrier's surface, a locatable wire is embedded as part of this device along the side of the length of the protective barrier connected by a strip with adhesive. According to most codes the tracer wire must be a sufficient distance from the gas line and this device will achieve that result in a uniform fashion.

The device may also have one or more of the following: At the start of each roll, a means of connection for the protective barrier and tracer wire to a subsequent roll to couple the protective barrier together when a single roll is not able to complete a underground utility line installation. Preferably a core in the center of the roll to tightly wind the product to and any kind of clip, fastener, or cord used to hold the roll together for handling and transportation. The protective barrier may be any variety of color as specified in the Uniform Color Code for underground utility lines, with yellow being designated for gas.

The disclosed device is unique when compared with other known devices and solutions because it provides direct protection for underground gas lines from excavation adding the needed time to recognize what is being hit before failure of the gas line; the protective barrier has a warning label and color coating for clear communication to any future excavators; and a locatable wire that has a much better resistance to breakage than foil, that runs parallel and is spaced appropriately by a connective strip and adhesive from the barrier that enables the ability for future locating/marking. Thus, protection, warning, and traceability are combined into one, easily installed product.

The disclosed device is unique in that it is structurally different from other known devices or solutions. More specifically, the device is unique due to the presence of a webbing that has a structure comprimising of continuous filaments that are in a warp and weft configuration, having sufficient flexibility and thickness to provide significant resistance to a driven edge of an excavator's tool or equipment; additionally, a warning text and signifying color is on the protective webbing/barrier to warn any future excavators of the buried utility line beneath; furthermore, a traceable wire spanning the length of the barrier, parallel with the barrier, spaced to the side of the barrier, and held to the barrier with a connective strip with adhesive to provide adequate distance from the tracer wire to the gas line. Adequate spacing of the tracer wire from the gas line will satisfy industry requirements and guidelines for locatable wire being used for underground gas or utility lines. Underground gas lines are typically made from a plastic composite that can easily be breached by anyone using excavation tools or equipment. The protective webbing of this device helps to prevent that breach.

Furthermore, the process associated with the aforementioned device is likewise unique. In the prior art a trench is dug into which the pipe is placed. Each jurisdiction will determine the depth of the ditch but it is not uncommon to have a trench of twelve inches or more. After the pipe is placed in the trench, the trench is filled to approximately one-half the depth of the trench; the process is commonly referred to as back filling. After the trench is partially back filled the warning tape and the tracer wire is placed in the partially filled trench and the trench is then completely filled.

In the current application a trench is dug, the gas pipe is laid in the trench, and the protective barrier is laid directly on the gas pipe, and then the trench is filled once. In this application the barrier is placed over the gas line, the required warning text and tracer wire are all installed in one application therefore eliminating the need to initially back fill one half the trench. Instead one can lay the pipe and barrier, then proceed to fully cover the trench, removing one step. As the protective barrier is placed over the pipe the tracer wire is also placed inside the trench at the same time at a distance proximate to the pipe but spaced at a safe distance from the gas line. This product will come in a roll and the roll of material is laid in the ditch. Sections of the device can be connected within a trench to extend the length of a trench. When starting a new roll as a continuation in a trench, the protective barrier can be spliced together by any appropriate means of splicing underground tracer wire.

NUMBERING REFERENCES

5 Protective Barrier
10 Embedded Traceable Wire
15 Adhesive Strip
20 Gas Line

DETAILED DESCRIPTION OF THE EMBODIMENTS

The present invention is directed to underground gas line protection warning and location.

Figure 1:
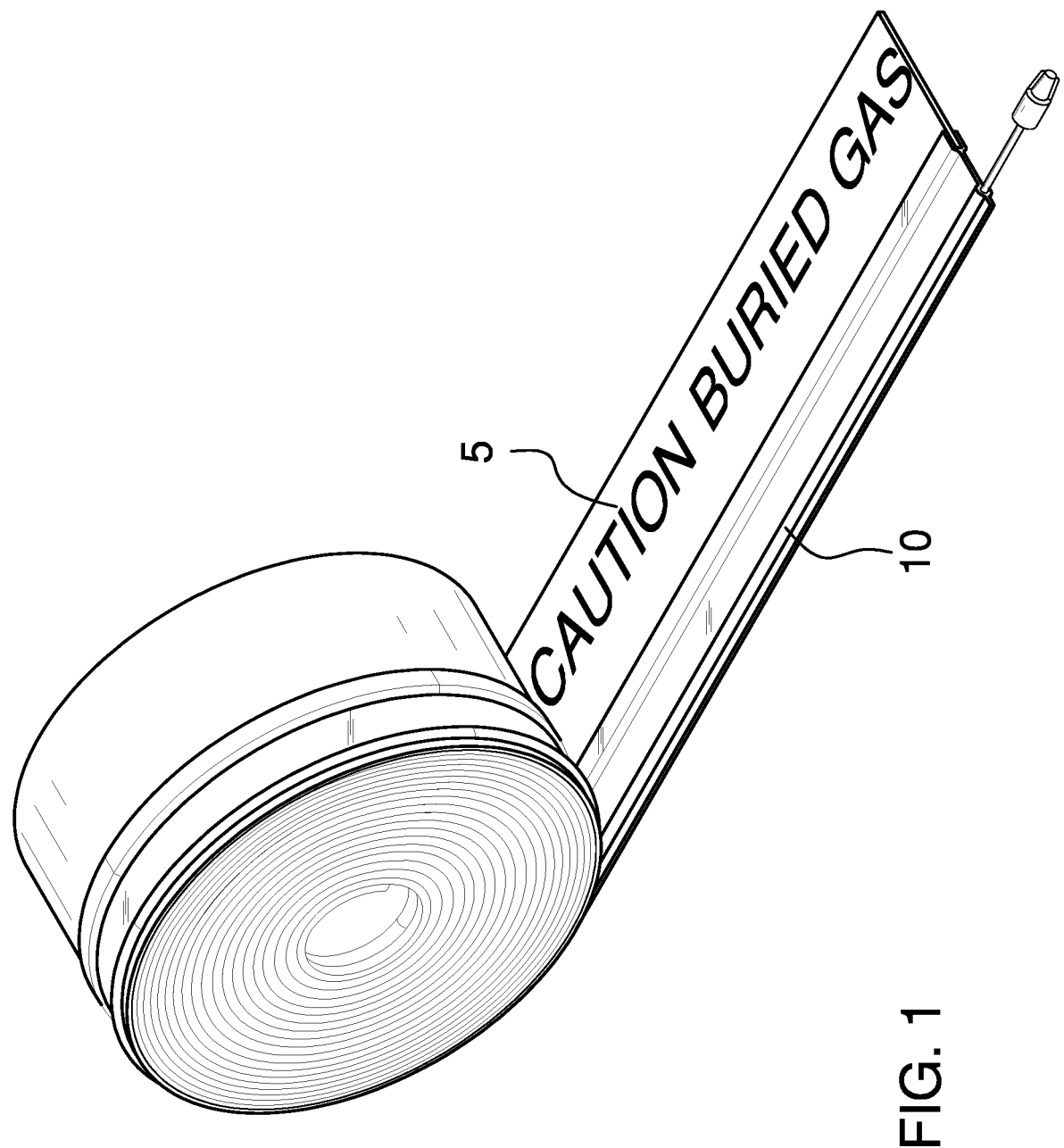
FIG. 1 is an Isometric view of the Underground Gas Line Protection, Warning, and Locater.
Figure 2:
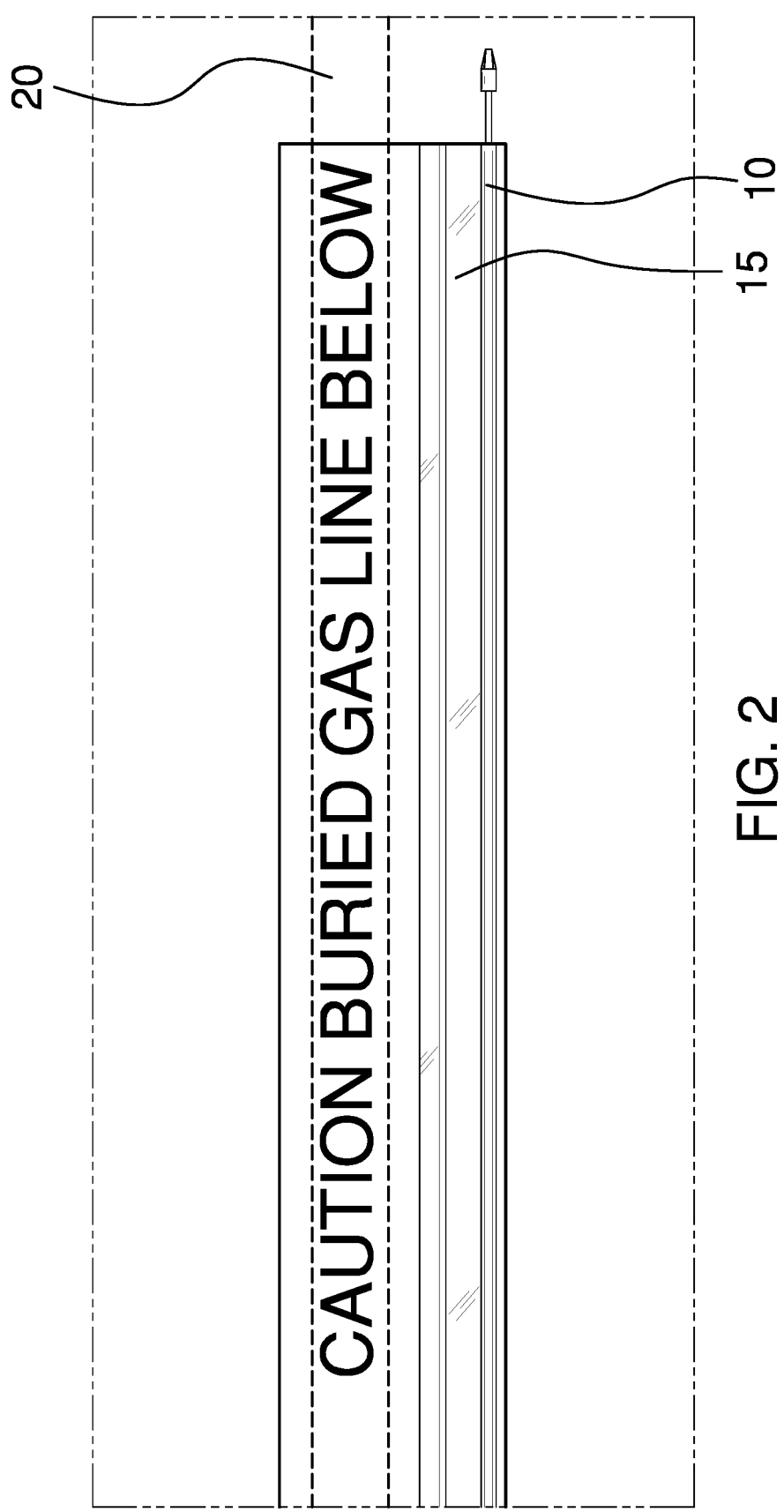
FIG. 2 is a top view of the device
Figure 3:
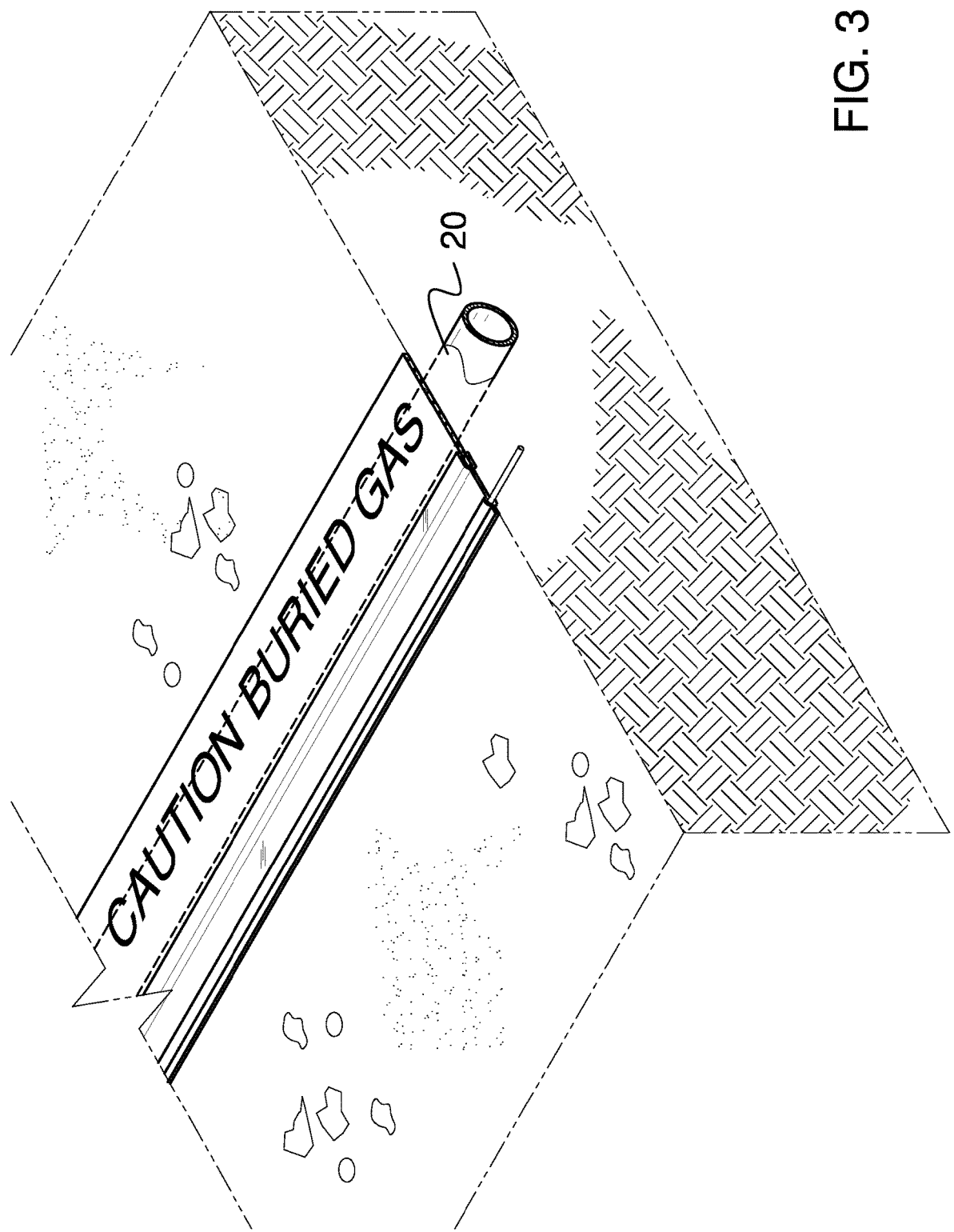
FIG. 3 is a detail view of the device and the placement in the trench.
Figure 4:
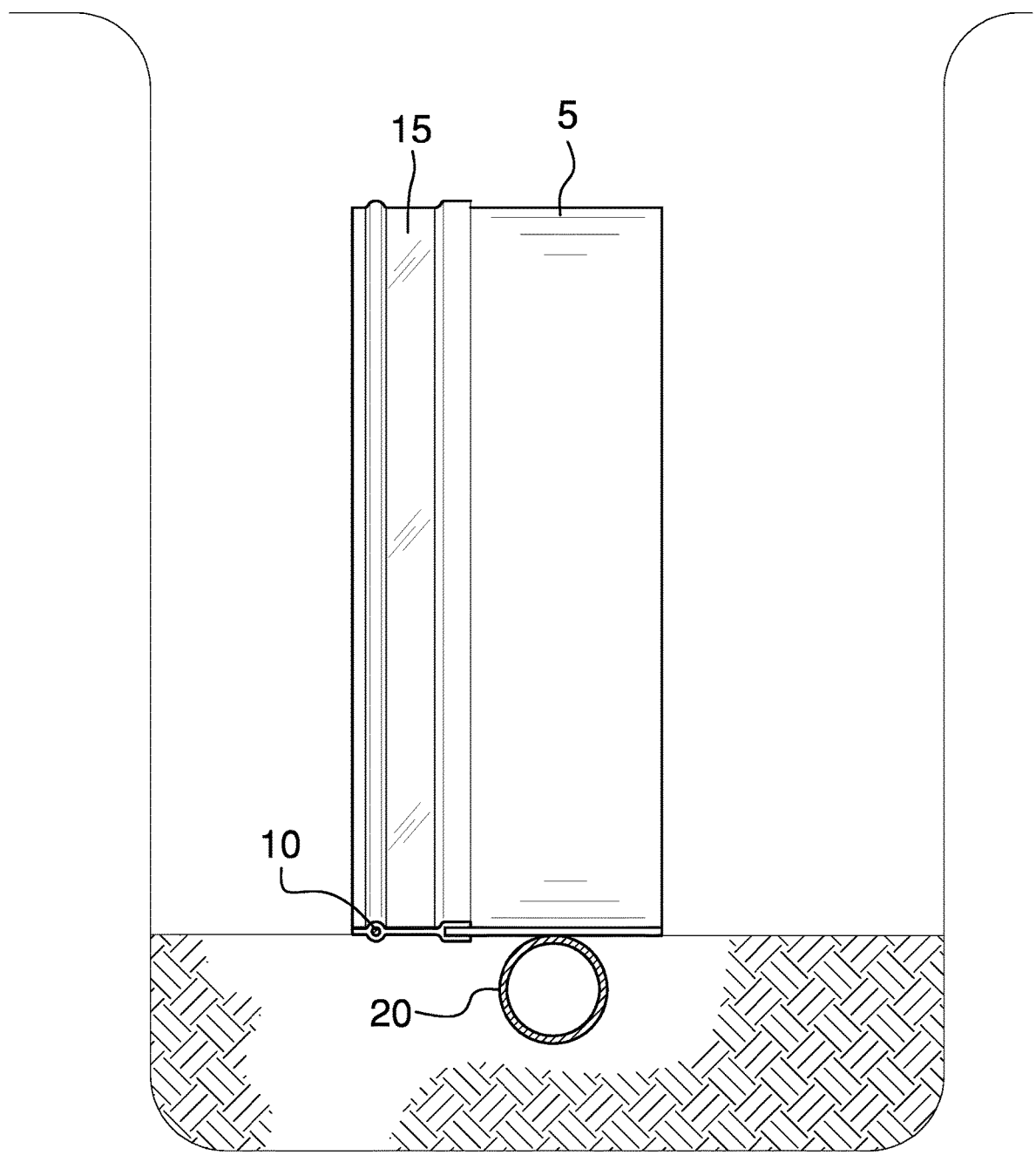
FIG. 4 is an in-use view of the device placed directly over the buried line depicting a front view that shows the placement of the device directly over the buried gas line.

In its most complete form, the device is made up of the following components, a protective barrier 5 with warning text and a locatable embedded traceable wire 10 on the side of the barrier and extending the length of the protective barrier. These components are related as follows: the protective barrier is constructed of a woven fabric that will protect the gas line from future damage caused by excavation with tools or equipment (a shovel for example), warning text that is on the top of the protective woven barrier and will communicate to the excavator what is being hit, and the detectable embedded traceable wire 10 that can be used to locate the utility line. In order to prevent degradation of the warning text once it is buried underground a layer is placed over the warning text. All components are in place to provide the maximum protection for underground gas or utility lines. It should further be noted that: the protective barrier 5 has a construct of woven thermoplastic material and the detectable embedded traceable wire 10 is joined in parallel to the protective barrier 5 by an adhesive strip 15 along the length of the barrier. The adhesive strip 15 consists of two layers joined to each other with adhesive. The embedded traceable wire 10 is fixed in between the two layers joined to each other with adhesive. The embedded traceable wire 10 is fixed between the two layers on one side of the edge of the protective barrier as depicted in FIG. 1 at an appropriate distance from the gas line.

The adhesive strip 15 that contains the embedded traceable wire 10 can be placed on either side of the protective woven barrier 5 but once placed cannot be removed. The adhesive strip 15 separates the protective woven barrier 5 from the embedded traceable wire 10 to ensure that an appropriate distance is maintained at all times between the underground line and the metallic tracer wire 10. When one roll is inadequate in length the protective barrier and tracer wire are attached to another roll of protective barrier and tracer wire within a trench by overlapping one section of the device over another section or utilizing ties to fasten the sections of the protective barrier together and a wire connector to splice the locatable wire together. Regardless of how much material is needed the entire length of the buried underground line should be covered by this device.

An embedded traceable wire 10 is required to locate the line after it is buried. The embedded traceable wire should be constructed of a metallic substance such as copper, aluminum or steel that can be easily located underground after the gas line is buried. However, because the embedded traceable wire is metallic this device allows it to be placed a sufficient distance away from the gas line to prevent an explosion if a sudden surge of electrical current strikes the embedded, traceable wire.

The most complete form of performing the method associated with the disclosed device consists of the following steps: dig a trench to the required depth and place the gas line in the trench. Place the protective barrier 5 with the embedded traceable wire 10 directly on the gas line 20, backfilling small amounts of dirt as needed over the protective barrier and wire to hold them in place, and cutting the end of the protective barrier and embedded traceable wire once the gas line is covered in its entirety and backfilling the trench. It should further be noted that: the protective barrier and wire width is not restricted to a certain size, but is sized appropriately to fit in a typical trench for a underground gas line. The specific width may vary depending on the particular requirements of a jurisdiction but this device allows the tracer wire, which is metallic, to be placed a sufficient distance away from the gas line to prevent an explosion in the event of a strong electrical current striking the tracer wire such as in a lightning strike.

The drawings and specific descriptions of the drawings, as well as any specific or alternative embodiments discussed, are intended to be read in conjunction with the entirety of this disclosure. The Underground Gas Line Protection, Warning, and Locater may, however, be embodied in many different forms and should not be construed as being limited to the embodiments set forth herein; rather, these embodiments are provided by way of illustration only and so that this disclosure will be through, complete and fully convey understanding to those skilled in the art.

The invention claimed is:

1. An underground gas line protection device which is comprised of:
   a. a protective barrier;
      wherein the protective barrier is a predetermined length;
      wherein the protective barrier is a predetermined thickness;
      wherein the protective barrier is a predetermined width;
      wherein the protective barrier is a woven material;
      wherein the protective barrier is laid directly on the underground gas line;
   b. warning text;
      wherein warning text is placed on the protective barrier;
   c. an embedded tracer wire;
      wherein the embedded tracer wire is a predetermined material;
      wherein the tracer wire is positioned on an edge of the protective barrier;
      wherein the embedded tracer wire does not directly contact the underground gas line;
      wherein the embedded tracer wire is positioned to a side of the underground gas line; and
   d. an adhesive strip;
      wherein the adhesive strip has a first edge;
      wherein the adhesive strip has a second edge;
      wherein the embedded tracer wire is positioned on the first edge of the adhesive strip;
      wherein the second edge of the adhesive strip is secured to the edge of the protective barrier.

2. The device as described in claim 1 wherein the tracer wire is copper.

3. The device as described in claim 1 wherein the tracer wire is steel.

4. A method of using a device as described in claim 1 which is comprised of the following steps;
   a. digging a trench for a gas line;
   b. placing the gas line in the trench;
   c. placing the protective barrier with embedded tracer wire over the gas line in the trench; and
   d. filling in the trench.

5. The method of using the device as described in claim 4 which is further described of placing sections of the protective barrier over previous sections of the protective barrier.

* * * * *